(12) United States Patent
Wild et al.

(10) Patent No.: US 7,405,879 B2
(45) Date of Patent: Jul. 29, 2008

(54) OPTICALLY VARIABLE ELEMENT HAVING A VARIABLE DISTANCE-LAYER THICKNESS

(75) Inventors: Heinrich Wild, Herzogenaurach (DE); Ludwig Brehm, Adelsdorf (DE)

(73) Assignee: Leonhard Kurz GmbH & Co. KG, Furth (DE)

( * ) Notice: Subject to any disclaimer, the term of this patent is extended or adjusted under 35 U.S.C. 154(b) by 658 days.

(21) Appl. No.: 10/520,803

(22) PCT Filed: Jul. 2, 2003

(86) PCT No.: PCT/DE03/02196

§ 371 (c)(1),
(2), (4) Date: Jan. 10, 2005

(87) PCT Pub. No.: WO2004/016441

PCT Pub. Date: Feb. 26, 2004

(65) Prior Publication Data

US 2005/0175815 A1   Aug. 11, 2005

(30) Foreign Application Priority Data

Jul. 17, 2002   (DE) ................................. 102 32 245

(51) Int. Cl.
*G02B 27/44* (2006.01)
(52) U.S. Cl. .............................. 359/566; 359/584; 359/2
(58) Field of Classification Search ................. 359/584, 359/567, 2
See application file for complete search history.

(56) References Cited

U.S. PATENT DOCUMENTS

| | | |
|---|---|---|
| 5,759,420 A | 6/1998 | Minnetian et al. |
| 5,801,857 A * | 9/1998 | Heckenkamp et al. ......... 359/2 |
| 6,491,324 B1 | 12/2002 | Schmitz et al. |
| 7,085,058 B2 * | 8/2006 | Heim ......................... 359/582 |
| 7,224,528 B2 * | 5/2007 | Phillips et al. .............. 359/584 |
| 2001/0012137 A1 | 8/2001 | Palmasi et al. |
| 2001/0028921 A1 | 10/2001 | Shaw et al. |

FOREIGN PATENT DOCUMENTS

| | | |
|---|---|---|
| DE | 197 31 968 A1 | 1/1999 |
| DE | 691 30 383 T2 | 3/1999 |
| DE | 199 41 295 A1 | 3/2001 |

(Continued)

*Primary Examiner*—Fayez G Assaf
(74) *Attorney, Agent, or Firm*—Hoffmann & Baron, LLP (57) ABSTRACT

The invention concerns an optically variable element and a security product having such an optically variable element, a foil, in particular an embossing foil or a laminating foil having such an optically variable element, and a process for producing such an optically variable element. The optically variable element has a thin film layer succession with at least one spacer layer for producing color shifts by means of interference. In a first region of the thin film layer succession the spacer layer is of a different layer thickness from in a second region of the thin film layer succession. In that case the layer thicknesses of the spacer layer in the first and second regions are so selected that in the first region of the thin film layer succession a first color shift is produced by means of interference and in the second region of the thin film layer succession a second color shift which is different from the first color shift is produced.

28 Claims, 7 Drawing Sheets

FOREIGN PATENT DOCUMENTS

| | | |
|---|---|---|
| EP | 0 660 262 A2 | 6/1995 |
| EP | 0 472 371 | 3/1999 |
| GB | 2 129 739 | 5/1984 |
| JP | 10116016 | 5/1998 |
| RU | 2 150 392 | 6/2000 |
| WO | WO 01/03945 A1 | 1/2001 |
| WO | WO 02/00445 A1 | 1/2002 |

* cited by examiner

OPTICALLY VARIABLE ELEMENT HAVING A VARIABLE DISTANCE-LAYER THICKNESS

CROSS-REFERENCE TO RELATED APPLICATIONS

This application is a National Phase application of International Application No. PCT/DE03/02196 filed Jul. 2, 2003, which claims priority based on German Patent Application 10232245.7, filed Jul. 17, 2002, which are incorporated herein by reference.

BACKGROUND OF THE INVENTION

The invention concerns an optically variable element, in particular an optically variable safeguard element for safeguarding banknotes, credit cards and the like, wherein the optically variable element has a thin film layer succession with at least one spacer layer for producing color shifts by means of interference. The invention further concerns a security product having such an optically variable element, a foil, in particular an embossing foil or a laminating foil with such an optically variable element and a process for producing such an optically variable element.

Optically variable elements are frequently used to make it difficult to misuse documents or copy documents and if possible to prevent that from happening. Thus optically variable elements are frequently used for safeguarding banknotes, identity papers, credit cards, cash cards and the like. It is further possible for them to be applied to articles and to be used for detecting authenticity of goods.

In order to make it difficult to copy optically variable elements, it is known for an optically variable element to be provided with a thin film layer succession which produces shifts by means of interference, in dependence on the viewing angle.

Thus, WO 01/03945 A1 describes a security product having a transparent substrate, to one side of which is applied a thin film which produces a perceptible color shift in dependence on the change in the viewing angle. The thin film comprises an absorption layer which is applied to the transparent substrate. The thin film further comprises a dielectric layer which is applied to the absorption layer. The absorption layer includes a material which consists of one of the following materials or an alloy of the following materials: chromium, nickel, palladium, titanium, cobalt, iron, tungsten, molybdenum, iron oxide or carbon. The dielectric layer comprises one of the following materials or a combination of the following materials: silicon oxide, aluminum oxide, magnesium fluoride, aluminum fluoride, barium fluoride, calcium fluoride or lithium fluoride. In order further to increase the level of safeguard against copying, WO 01/03945 A1 further proposes embossing a diffraction pattern on the side of the transparent substrate, which is in opposite relationship to the thin film layer.

EP 0 660 262 B1 proposes building up a thin film layer succession comprising a plurality of successive layers with differing refractive indices. Those layers involve layers of ceramic material which are successively applied to a carrier substrate by vapor deposition. Thus firstly a release layer comprising thermoplastic acrylic resin to which silicone oil is added is applied to a polyester film which is 12 μm in thickness. Then a magnesium fluoride layer which has a low refractive index and a zinc sulfide layer which has a high refractive index are alternately applied by vapor deposition. In total in that case five such layers are successively applied by vapor deposition. The total layer thickness of the thin film layer succession formed in that way is 1 μm in that case. An adhesive layer is then applied to the thin film layer succession.

EP 0 660 262 B1 further proposes engraving a pattern into the release layer. That provides that, upon transfer of the thin film layer succession on to an article or a document, the thin film layer succession is released from the carrier material only in the region in which the release layer is present. The thin film layer remains adhering to the carrier material in the other regions, and thus tears away. That provides that only parts of the thin film layer are stuck on the article or document. The same effect can also be achieved if the adhesive layer is applied in a pattern configuration.

That provides that, in a first partial region, there is a different number of thin film layers than in a second region, and thus the total layer thickness of the thin film layer succession varies between 1 μm (five thin film layers) and 0 (no thin film layers). That 'region-wise application' of thin film layers to an article can produce on the article a pattern which can be electronically detected and evaluated by means of an evaluation device.

WO 02/00445A1 describes an optically variable element comprising a plurality of layers which are arranged throughout in mutually superposed relationship. The optically variable element has on the one hand a thin film layer succession. That thin film layer succession produces the effect of a color change which is dependent on the viewing angle, by means of interference. In addition the optically variable element has a replication layer into which diffractive relief structures are embossed. Those diffractive structures make it possible to achieve diffraction effects by which holograms and the like can be represented.

In that respect, in regard to production procedure, firstly the thin film layer succession is applied to the replication layer and then the relief structure is embossed thereon.

WO 02/00445 A1 proposes that the thin film layer succession is built up from an absorption layer and a spacer layer. It is further proposed that a prefabricated thin film layer succession is provided with an embossable lacquer and then relief structures are embossed into that lacquer. As an alternative thereto it is stated that the prefabricated thin film layer succession can be glued to prefabricated microstructures.

SUMMARY OF THE INVENTION

Now, the object of the invention is to provide an optically variable element which can only be imitated and copied with difficulty and by means of which therefore the anti-forgery security of security products can be improved.

That object is attained by an optically variable element, in particular an optically variable safeguard element for safeguarding banknotes, credit cards and the like, which has a thin film layer succession with at least one spacer layer for producing a color shift by means of interference and in which in a first region of the thin film layer succession the spacer layer is of a different layer thickness from in a second region of the thin film layer succession, wherein the layer thicknesses of the spacer layer in the first and second regions are so selected that in the first region of the thin film layer succession a first color shift is produced by means of interference and in the second region of the thin film layer succession a second color shift which is different from the first color shift is produced. That object is further attained by a security product and by a foil, in particular an embossing foil or laminating foil, which is provided with such an optically variable element. That object is further attained by a process for producing an optically variable element wherein applied to a substrate is a thin film layer succession with at least one spacer layer for producing color shifts by means of interference and wherein in a first region of the thin film layer succession the spacer layer is shaped in a different layer thickness from in a second region of the thin film layer succession, wherein the layer thickness of the spacer layer in the first and second regions is so selected that in the first region of the thin film layer succession a first color shift is produced by means of interference and in the second region of the thin film layer succession a second color shift which is different from the first color shift is produced.

The invention achieves the advantage that an optically variable element according to the invention is substantially more difficult to copy than is the case with the optically variable elements known in the state of the art. That means that the anti-forgery security of security products which are provided with an optically variable element designed in accordance with the invention or with an optically variable element produced by means of a process according to the invention is considerably increased. By virtue of the invention, patterns can be produced with clearly recognisable, directly mutually juxtaposed or interengaging regions, with different color shifts. The application of a spacer layer in a differing layer thickness requires a high level of technological complication and expenditure. In addition an element produced in that way, in comparison with prefabricated thin film foil, represents an individualised element so that, taking a prefabricated thin film foil as the basic starting point, it is not possible to imitate the optically variable element.

Thus there are in particular advantages over flat or surface elements of a sandwich-like structure. Thus for example the optically variable element described in WO 02/00445 A1—as described in WO 02/00445 A1 as a possible mode of manufacture—can be imitated by a prefabricated thin film foil being processed with an embossing stamp with which a diffractive structure is embossed into the thin film foil.

Further advantages are afforded by virtue of the fact that the array of shapes available for the design configuration of an optically variable element is increased. Thus for example it is possible to produce fluid transitions at which the color shifts which are dependent on the viewing angle continuously change.

Advantageous configurations of the invention are set forth in the appendant claims.

It is advantageous for the optically variable element to be provided with a diffractive structure, in particular for producing diffraction effects. That diffractive structure can for example be embossed into a transparent layer arranged over the thin film layer succession. It is particularly advantageous in that respect if the diffractive structure covers not only the first but also the second region of the thin film layer succession. In that way the optical effect produced by the diffractive structure is partially superimposed with different color shifts which are dependent on the viewing angle. In that way on the one hand the anti-forgery security of the optically variable element is enhanced: this involves an additional security feature. In addition this also ensures that the optical effect produced by an optically variable element according to the invention cannot be imitated by arranging in side-by-side relationship two different prefabricated thin film layer successions. In the operation of applying the diffractive structure by embossing, faults and errors occur in the embossed diffractive structure in the transitional region of the two prefabricated thin film layers by virtue of their differing material structure and under some circumstances differing thicknesses. This means that such forgeries can be readily recognised by the viewer.

From the point of view of production procedure advantages are achieved if, in the first region of the thin film layer succession the spacer layer comprises two or more partial layers which are applied one over the other and which jointly form the spacer layer in that region, and in the second region the thin film layer succession has only one of the two or more partial layers, which forms the spacer layer in that region of the thin film layer succession. The partial layers preferably comprise the same material. It is however also possible for the partial layers to be formed from different materials with the same optical properties (in particular refractive indices). This is advantageous if various partial layers are applied with different processes and the materials used can thus be adapted to the nature and manner of applying them.

In that respect attractive effects can be achieved if the two or more mutually superposed partial layers are formed as different patterns. Depending on the respective superimposition of those patterns therefore, this affords different color shifts dependent on viewing angle in partial regions of the optically variable element. Clever designing of those patterns means that a large number of different kinds of color shifts, which are dependent on viewing angle, can be implemented in an optically variable element in a simple manner from the production point of view.

An increase in the level of anti-forgery safeguard can further be achieved if at least one of the partial layers is in the form of a random pattern. That produces an individual optically variable element which is unique in its nature. As an alternative thereto it is also possible for the layer thickness of the spacer layer to be subjected overall to the action of a random function and thus also for the above-described effect to be produced.

The spacer layer can further be applied by printing to a substrate with a multiple roller assembly, thereby also affording a layer thickness distribution which is random.

From the point of view of manufacturing procedure, advantages are achieved if those two or more mutually superposed partial layers are applied in superposed relationship by means of vapor deposition masks of differing shapes. Equally, advantages in regard to manufacturing procedure are achieved if the two or more mutually superposed partial layers are applied by means of a printing process. Thus, the partial layers applied in a first printing procedure can be over-printed in a second printing procedure, whereby, in the regions in which the over-printing is applied, the layer thicknesses of the partial layers are added together, and in that way a different kind of color shift is produced in that region.

A further way of applying the spacer layer, which is desirable from the point of view of production procedure, provides that different patterns are applied by printing to the substrate in register relationship, with different layer thicknesses.

A further possibility which affords advantages both in regard to the possible design configurations and also in regard to enhancing the level of security, provides that the layer thickness of the spacer layer constantly alters between the first region and the second region of the thin film layer succession so that, in that region of the thin film layer succession, the color shift produced by the thin film layer succession continuously changes. In addition it is also possible for the layer thickness of the spacer layer to change continuously and/or non-continuously between the first and second regions of the thin film layer succession so that in that region of the thin film layer succession the color shift produced by the thin film layer succession changes continuously or non-continuously respectively.

In that respect, such effects can be achieved if the spacer layer is delimited on the one hand by an absorption layer applied to a macro-structured replication layer and on the other hand by a substantially planar layer, so that the layer thickness of the spacer layer is determined by the macro-structured replication layer. The spacer layer thus fills the region between the planar layer and the macro-structured replication layer. Another possibility involves applying the spacer layer by means of a printing roller which is of such a configuration that the thickness of the spacer layer continuously changes.

A further possibility involves producing a macro-structured spacer layer by means of a surface-structured printing roller.

The spacer layer is therefore desirably macro-structured and delimited on the one hand by an absorption layer and on the other hand by a reflection layer.

It is desirable if the thin film layer succession has a reflecting layer, preferably a metal layer. That metal layer provides that the color shift which is produced by the thin film layer succession and which is dependent on the viewing angle can be better recognised. Further possible design configurations are afforded if that reflecting layer only partially covers the surface region of the thin film layer.

It is advantageous for the thin film layer succession to be provided with an absorption layer which acts as an absorption layer and as a replication layer. It is further possible to provide an absorption layer and a replication layer, which are formed from the same material.

Interesting and attractive effects can be produced if the thickness of the spacer layer in the second region is so selected that the coherence condition in the range of visible light is not satisfied in the second region. If the coherence condition is no longer satisfied, no more interference phenomenon occurs and the second region acts as a purely reflective element. The coherence condition and thus the layer thickness to be selected depend on the light source used. By virtue of that mode of operation, it is possible to produce reflecting elements in a manner which is inexpensive and simple in respect of production procedure.

Further design elements for enhancing the level of anti-forgery security are further afforded if the spacer layer is colored—possibly only partially.

It is advantageous if the optically variable element has a continuous transparent layer, in particular a protective lacquer layer.

BRIEF DESCRIPTION OF THE DRAWINGS

The invention is described by way of example hereinafter by means of a number of embodiments by way of example with reference to the accompanying drawings in which.

DETAILED DESCRIPTION OF THE INVENTION

Figure 1A:
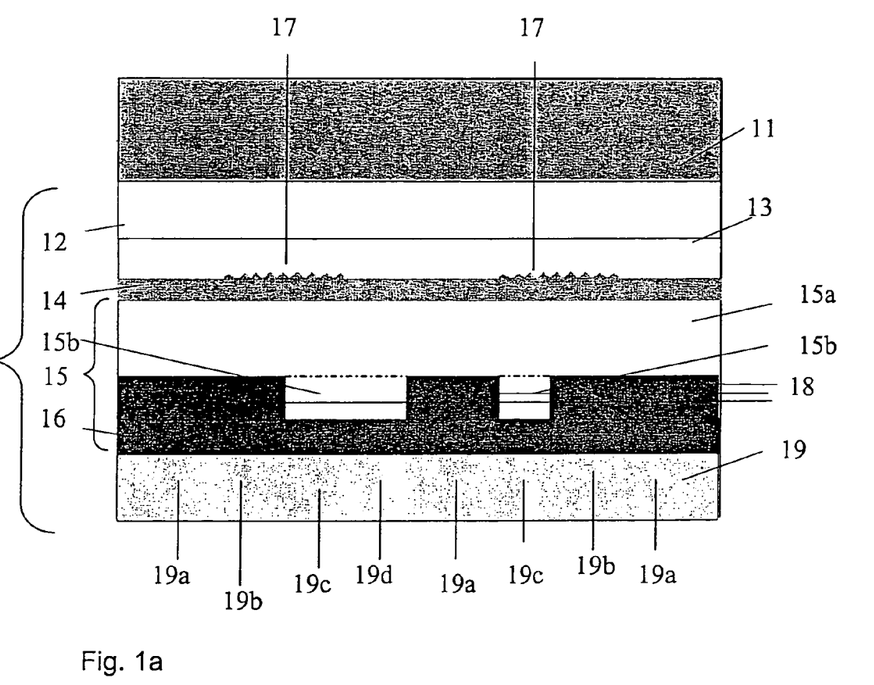
FIG. 1a shows a view in section through an optically variable element according to the invention for a first embodiment of the invention.

FIG. 1a shows a portion of an optically variable element 1 which is still part of a foil, in particular an embossing foil. That optically variable element 1 is intended to be applied to a security product, for example a banknote, a credit card, a cash card or a document. There is also the possibility of the optically variable element 1 being applied as a security or authenticity identification to an article, for example to a CD or a packaging.

Besides the optically variable element 1 FIG. 1a shows a carrier 11. The carrier 11 comprises for example PET. The carrier 11 serves for applying the optically variable element to the object to be safeguarded, in a production procedure. After application or upon application of the optically variable element to the object to be safeguarded, the carrier 11 is removed. FIG. 1a thus shows the optically variable element 1 at a stage in which it is part of a foil, for example an embossing foil or a laminating foil.

The optically variable element 1 has six layers 12 through 19.

The layer 12 is a protective lacquer layer and/or release layer. The layer 13 is a replication layer. The layer 14 is an absorption layer. The layer 15 is a spacer layer formed by two partial layers 15a and 15b. The layer 16 is a reflection layer formed by a metal layer or an HRI layer (HRI=High Refractive Index). The layer 19 is an adhesive layer.

In the situation where the optically variable element 1 is part of a laminating foil, the layer 12 has a bonding agent layer.

The layers 14, 15 and 16 form a thin film layer succession which produces color shifts dependent on viewing angle, by means of interference. In this respect, there are various possible ways of constructing a thin film layer succession by means of which such color shifts, dependent on viewing angle, can be produced by means of interference:

On the one hand, as shown in FIG. 1a, such a thin film layer succession can be formed by an absorption layer (preferably with between 30 and 65% transmission), a transparent spacer layer as a color change-producing layer ($\lambda/4$ or $\lambda/2$ layer) and a reflecting layer (reflecting element) or with an optical separation layer (transmissive element). If the thin film layer succession is to perform the function of a reflecting element, the thickness of the spacer layer is to be so selected that the $\lambda/4$ condition is satisfied. If the thin film layer succession is to satisfy the function of a transmissive element, the layer thickness of the spacer layer is here to be so selected that the $\lambda/2$ condition is met. In that respect $\lambda$ is so selected that $\lambda$ is preferably in the range of light which is visible to a human viewer.

It is further also possible for a thin film layer succession which produces color shifts dependent on viewing angle by means of interference to be made up of a sequence of high-refractive and low-refractive layers. With such a layer structure, it is possible to forego the use of an absorption layer.

The high-refractive and low-refractive layers of such a thin film layer succession respectively form an optically effective spacer layer which has to observe the above-described conditions. The greater the number of layers adopted, the correspondingly sharper is it possible to adjust the wavelength for the color change effect.

Such a thin film layer succession can be made up of a plurality of low-refractive and high-refractive layers. It is particularly advantageous however for such a thin film layer succession to be made up from between two and ten layers (even-number variant) or between three and nine layers (odd-number variant).

Examples of usual layer thicknesses for the individual layers of such a thin film layer succession and examples of materials which in principle can be used for the layers of such a thin film layer succession are disclosed for example in WO 01/03945, page 5, line 30 through page 8, line 5.

In production of the optically variable element 1, firstly the protective lacquer layer and/or the release layer 12 are applied to the carrier 11. In this respect the protective lacquer layer can also be colored.

The replication layer 13 is then applied. The replication layer 13 comprises for example a thermoplastic material. One or more diffractive structures is then embossed into the thermoplastic material of the replication layer, by means of an embossing tool.

It would also be possible to forego the provision of the replication layer 13 on the optically variable element 1 and/or the embossing of diffractive structures. The diffractive structures only serve to further enhance the level of security of the optically variable element 1. The diffractive structures 17 preferably involve diffractive structures which produce holograms and the like by means of diffraction effects. Instead of diffractive structures however it is also possible to emboss in the layer 13, matt structures, macrostructures, achromatic-symmetrical structures, for example sine gratings, achromatic-asymmetrical structures, for example blaze structures, or kinoforms. The diffractive structures 17 can in that case cover the entire surface area of the optically variable element. It is however also possible and, for certain uses, highly advantageous, if the diffractive structures 17 only partially cover the area of the optically variable element 1.

The absorption layer 14 is now applied to the replication layer 13 preferably over the full area thereof. In that respect, the absorption layer can be applied by vapor deposition or by printing.

In that respect, the replication layer 13 and the absorption layer 14 differ in their refractive index. Preferably there is a difference in refractive index of at least 0.2 between the layers 13 and 14.

It is also possible for the absorption layer and the replication layer to be formed by a single layer.

The partial layer 15a is now applied to the absorption layer 14 over the full surface area thereof by vapor deposition. The partial layer 15b of the spacer layer 15 is then applied to the partial layer 15a in region-wise manner and in a patterned configuration.

The materials used for the partial layers 15a and 15b are preferably the same materials. It is however also possible for materials with substantially identical optical properties (in particular refractive index) to be used for the partial layers 15a and 15b. In that respect, there are a number of possible options in regard to region-wise application of the partial layer 15b:

On the one hand, it is possible for the partial layer 15b to be applied to the partial layer 15a in region-wise manner by means of vapor deposition masks which cover surface regions of the optically variable element 1.

It is further possible for the partial layer 15b to be applied by vapor deposition to the partial layer 15a over the full area thereof and then for the partial layer 15b to be removed again, in certain surface regions. That can be effected on the one hand by a procedure whereby an etching agent or an etching mask is printed on the partial layer 15b and then the partial layer 15b is removed region-wise again by positive or negative etching and a subsequent washing operation. For such a procedure, it is advantageous if materials with different chemical properties are used for the partial layers 15a and 15b.

It is further possible for the partial layer 15b which is applied over the full surface area to be removed by means of an ablation process, for example laser ablation, or plasma or ion bombardment. In that respect, it is also possible to transfer digitally stored images, texts and codes by means of such ablation processes.

In addition there is also the possibility of applying the layer 16 over the full surface area to the partial layer 15b which was applied over the full surface area, and then removing both the layer 16 and also the layer 15 again in region-wise manner by means of one of the above-described processes (positive etching, negative etching or ablation).

A further possible option also involves not building up the spacer layer 15 in region-wise manner from two partial layers 15a and 15b, but applying the spacer layer 15 over the full surface area involved and then removing it again in region-wise manner in a thickness corresponding to the thickness of the partial layer 15b, by one of the above-described processes (positive etching, negative etching and ablation).

The above-described operating procedures provide that, in the regions 19a and 19b of the thin film layer succession, the spacer layer 15 is only formed by the partial layer 15a and thus, in that region, the spacer layer 15 is of the thickness of the partial layer 15a. In regions 19c and 19d of the thin film layer succession the partial layers 15a and 15b are arranged one over the other and the spacer layer 15 is thus of a thickness which is composed of the overall thickness of the partial layers 15a and 15b. Thus, in the regions 19a and 19b, a first color shift which is dependent on the layer thickness of the partial layer 15a is produced by the thin film layer succession by means of interference. In the regions 19c and 19d, a color shift which is different from that color shift and which is dependent on the total layer thickness of the partial layers 15a and 15b is produced by the thin film layer succession 15 by means of interference. The layer thicknesses of the layers 15a and 15b are now to be selected, in dependence on the materials adopted for the layers 15a and 15b, in such a way that the layer thickness of the layer 15a produces the $\lambda\frac{1}{4}$ or $\lambda\frac{1}{2}$ condition for a first, desired color shift effect. The layer thickness of the partial layer 15b is to be so selected that the overall layer thickness of the layers 15a and 15b (under some circumstances, having regard to slight differences in the refractive indices) satisfies the $\lambda\frac{1}{4}$ or $\lambda\frac{1}{2}$ condition for a second desired color shift effect which differs as markedly as possible from the first color shift effect. A structure for the thin film layer succession, produced as described above, thus makes it possible to produce an optically variable element in which regions with two different color shift effects alternate. The structure of the spacer layer which consists of two partial layers affords the advantage in this case that the layer thickness of the spacer layer is very constant in the various regions and thus a constant color shift effect which is clearly delimited from an adjacent region is produced. That has advantages in particular in security uses in which clearly defined and easily recognisable security features are required for authenticity identification.

It is also possible for the spacer layer 15 not to be made up from two partial layers 15a and 15b, but for the spacer layer 15 to be made up from three or more partial layers. In that way it is possible to suitably increase the number of different color shift effects which can be used within an optically variable element.

The layer 16 which can be a metal layer is now applied to the thin film layer succession. A colored metal can also be selected as the metal for that metal layer. Essentially chromium, aluminum, copper, iron, nickel, silver or gold or an alloy with those materials can be used as such materials.

It is further possible for the layer 16 applied to be a layer comprising high-shine or reflective metal pigments.

As already referred to above, it is possible in this respect to provide only a partial layer 16. The layer 16 can be applied for example over the full surface area involved and removed again by one of the above-described processes (positive or negative etching or ablation). On the other hand it is also possible for the metal layer to be only partially applied by vapor deposition, by using vapor deposition masks.

Instead of using a metal layer for the layer 16 it is also possible for the layer 16 to be in the form of a transmission layer. In that case it is also possible for the layer 16 to be merged with the layer 19 if the adhesive layer consists of a material which satisfies the condition of a transmission layer.

In particular materials such as oxides, sulfides or chalcogenides are considered as the transmission layer. What is decisive in terms of the choice of the materials is that there is a difference in refractive index, in relation to the materials used in the spacer layer 15. That difference should preferably be not less than 0.2. Depending on the respective materials used for the spacer layer 15, an HRI material or an LRI material (HRI=High Refractive Index; LRI=Low Refractive Index) is thus used for the layer 16.

If, as described above, the thin film layer succession is made up of a sequence of a plurality of dielectric layers with alternately high and low refractive indices, each of those layers is to be like the layer 15. Thus, those layers, as described in respect of the layer 15, are successively built up one upon the other by full-area or region-wise vapor deposition (or removal) of partial layers.

It is also possible for regions 18 which occupy the regions between the partial layer 15b which is provided only in a region-wise manner, not to be filled up with the metal layer 16, but to provide in that layer a transmissive material which is markedly different from the refractive index of the spacer layer 15. In that way it is possible for the metal layer 16 to be formed in a planar configuration. That can be achieved for example by the layer 16 being laminated on to the thin film layer succession and by the bonding agent layer required for that purpose satisfying the above-described condition in regard to refractive index.

Thus, a person viewing the optically variable element 1 can recognise different effects in the surface regions 19a through 19d.

A first color shift effect which is dependent on viewing angle occurs in the surface region 19a. In the surface region 19b, that effect is superimposed by a diffraction effect, for example a hologram. In the surface region 19d, the viewer has a second color shift effect which is dependent on viewing angle and which is different from the first color shift effect. In the surface region 19c, that color shift effect is superimposed by a diffraction effect, for example a hologram.

Figure 1B:
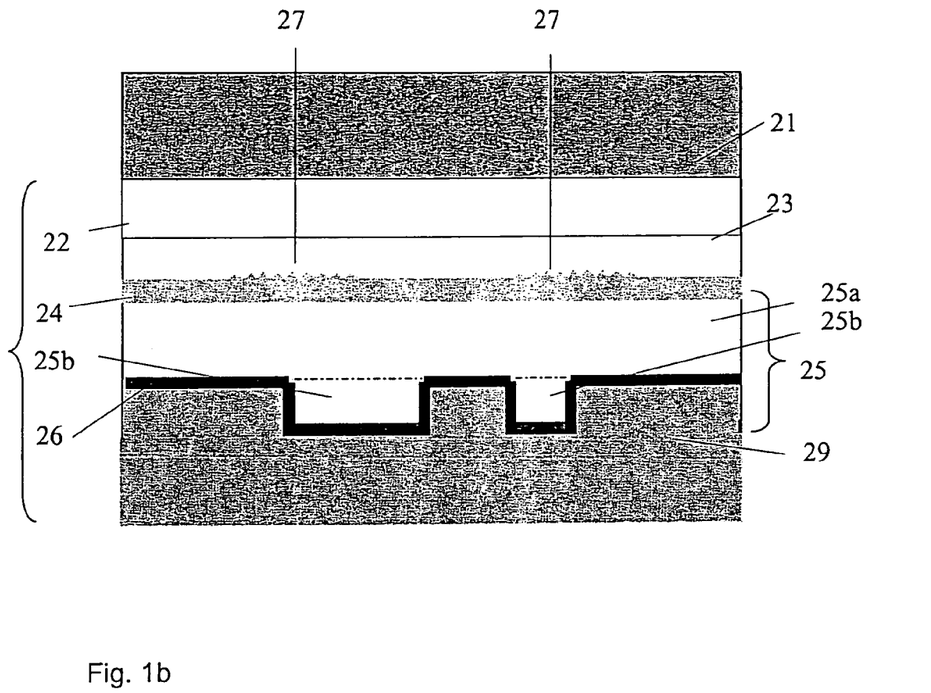
FIG. 1b shows a view in section through an optically variable element according to the invention for a second embodiment of the invention.

FIG. 1b shows an optically variable element 2 which is of substantially the same construction as the optically variable element 1.

The optically variable element 2 is applied to a carrier 21 which is designed like the carrier 11. The optically variable element 2 has five layers 22, 23, 24, 26 and 29 which are constructed like the layers 12, 13, 14, 15 and 16. Embossed in the layer 23 is a diffractive structure 27, which is like the diffractive structures 17 in FIG. 1a.

As can be seen from FIG. 1b, a thin metal layer is produced by vapor deposition on the thin film layer succession formed by the absorption layer 24 and the spacer layer 25 with the partial layers 25a and 25b. The thin metal layer follows the contours of the spacer layer 25. In that respect, the metal layer 26 is of approximately the same thickness at any location. That effect is easily afforded if a very thin metal layer is applied by vapor deposition to the thin film layer succession produced as shown in FIG. 1a. The spacer differences which occur due to the spacer layer which is of different thicknesses are compensated by the adhesive layer 29, in the optically variable element 2.

Figure 2:
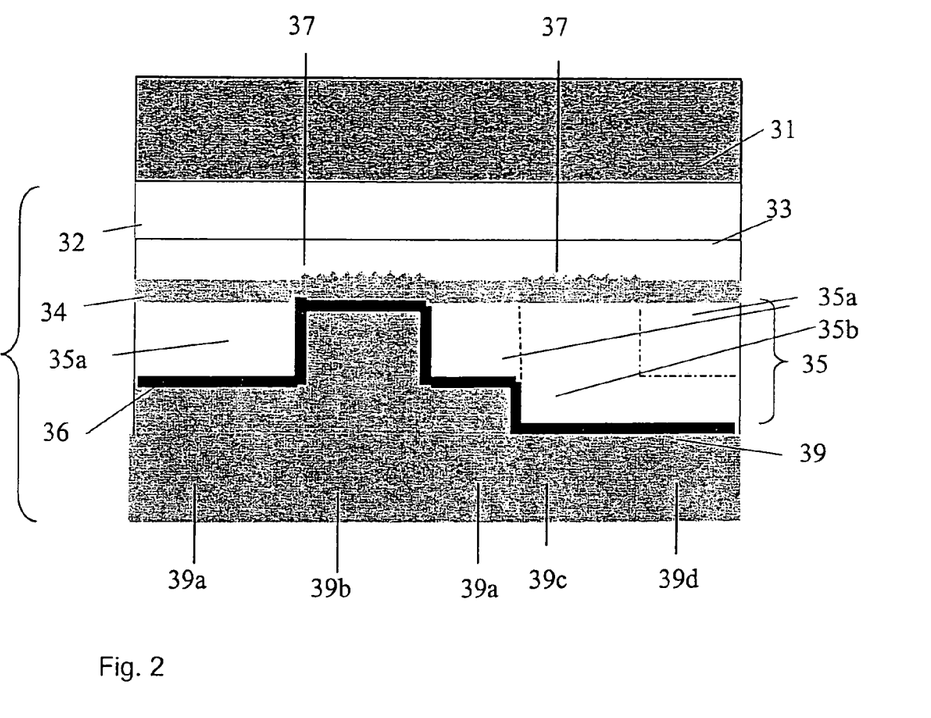
FIG. 2 shows a view in section through an optically variable element according to the invention for a third embodiment of the invention.

FIG. 2 shows a further possible way of producing an optically variable element according to the invention, by means of vapor deposition masks.

FIG. 2 shows an optically variable element 3 which is applied to a carrier 31. In this case the carrier 31 is like the carrier 11 shown in FIG. 1a.

The optically variable element 3 has six layers 32, 33, 34, 35, 36 and 39, two partial layers 35a and 35b, diffractive structures 37 and a plurality of surface regions 39a through 39d.

The layer 32 is a release and/or protective lacquer layer. The layer 33 is a replication layer in which the diffractive structures 37 are embossed. The layer 34 is an absorption layer. The layer 35 is a spacer layer formed by the partial layers 35a and 35b. The layer 36 is a metal layer. The layer 39 is an adhesive layer. The layers 32, 33, 34, 36 and 39 as well as the partial layers 35a and 35b are preferably constructed like the layers 12, 13, 14, 16, 19 and the partial layers 15a and 15b respectively. Differences lie however in the way in which the partial layers 35a and 35b of the spacer layer 35 are applied to the absorption layer 34.

Firstly the partial layer 35a is applied to the absorption layer 34 in region-wise manner by vapor deposition. That can be effected on the one hand by the partial layer 35a being applied by vapor deposition to the absorption layer 34 in an only region-wise manner thereon, using vapor deposition masks. This can also be effected by a procedure whereby the partial layer 35a is applied to the absorption layer 34 over the full surface area thereof by vapor deposition and is then removed region-wise by one of the above-described processes (positive etching, negative etching or ablation).

After the conclusion of the above-described process, the partial layer 35a is applied to the absorption layer 34 only in the surface regions 39a and 39d, and is absent in the surface regions 39c and 39b.

The partial layer 35b is now subsequently applied. In this case, the partial layer 35b is also applied only in region-wise manner to the layers which are already present. Thus, the partial layer 35b is applied to the absorption layer 34 and the partial layer 35a respectively, only in the region 39c and 39d. That region-wise application of the partial layer 35b can be carried out by means of the processes described for region-wise application of the partial layer 15b as shown in FIG. 1a.

In the surface region 39a therefore only the partial layer 35a is applied to the absorption layer 34 so that, in that region, the thickness of the spacer layer 35 results from the thickness of the partial layer 35a. There is no spacer layer in the surface region 39b so that there are no color shifts dependent on viewing angle, in that surface region. In the surface region 39d, the two partial layers 35a and 35b are disposed one over the other so that, in that region, the spacer layer 35 involves the overall layer thickness of the two partial layers 35a and 35b. Only the partial layer 35b is present in the region 39c.

For application of the partial layer 35b, preferably a structured printing roller or a vapor deposition process is selected, which applies to the subjacent layers, a thickness of material which corresponds to a preset spacing thickness. In that way, the partial layer 35b in the region 39c is of a layer thickness which corresponds to that spacing layer thickness and thus the thickness of the surface region 39d.

Accordingly, for a person viewing the optically variable element 3, there is a first color shift effect which is dependent on viewing angle in the surface region 39a and there is a second color shift effect which is different from the first color shift effect, in the surface regions 39c and 39d. Those effects are superimposed in the surface region 39c by optical effects which are produced by the diffractive structure 37. No color shift effects which are dependent on viewing angle occur due to the thin film layer succession, in the surface region 39b. In that surface region, only the optical-diffraction effects produced by the diffractive structure 37 are visible to the person viewing it.

The possibility described hereinbefore with reference to FIG. 2, of also applying the first partial layer only in region-wise manner, thus affords many further possible ways of designing an optically variable element according to the invention. It will be appreciated that the possibility of applying the first partial layer only in region-wise manner can also be applied to a spacer layer which is made up of more than two partial layers.

Figure 3:
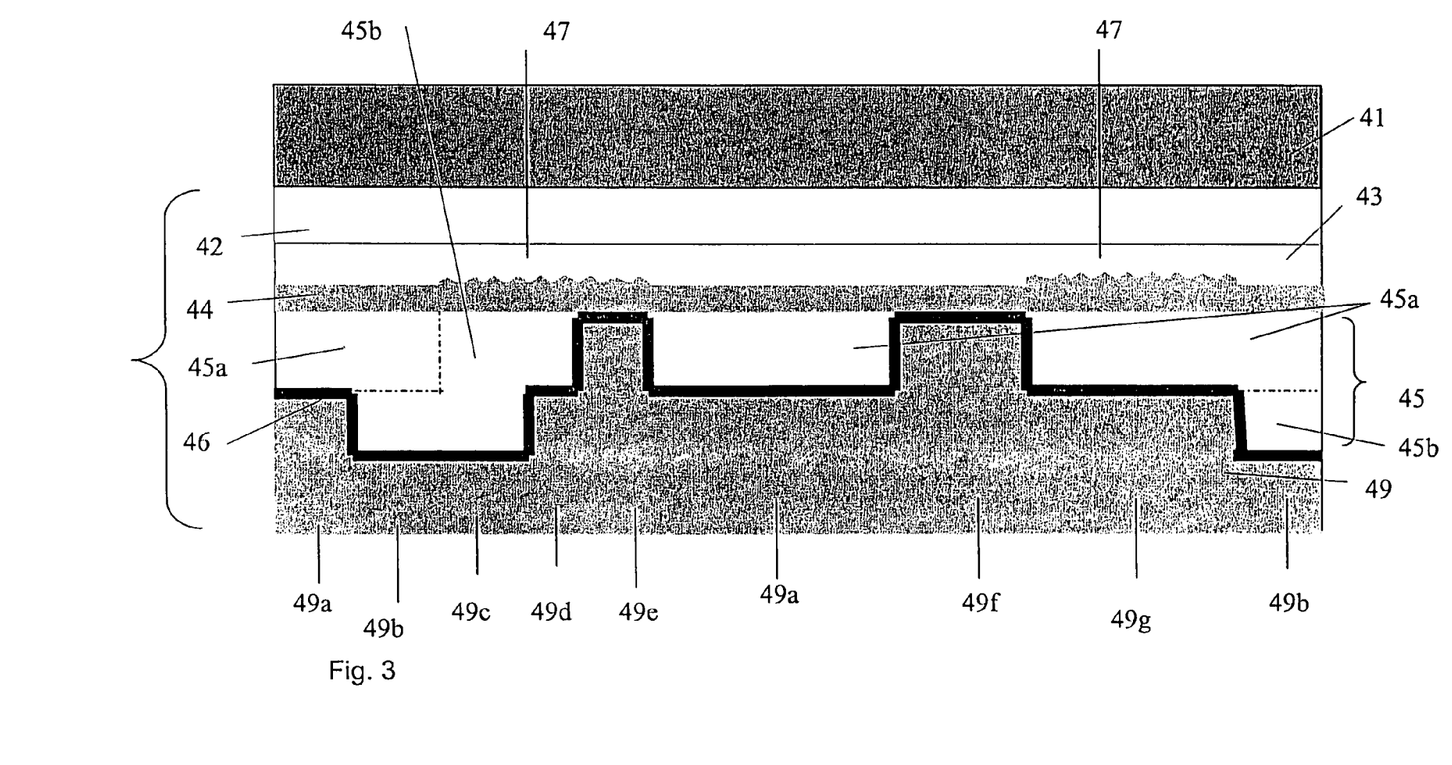
FIG. 3 shows a view in section through an optically variable element according to the invention for a fourth embodiment of the invention.

Reference is now made to FIG. 3 to describe a possible way of producing an optically variable element according to the invention, by means of a spacer layer which is applied by printing.

FIG. 3 shows an optically variable element 4 which is applied to a carrier 41. The carrier 41 is like the carrier 11 shown in FIG. 1a.

The optically variable element 4 has a release and protective lacquer layer 42, a replication layer 43 with diffractive structures 47, an absorption layer 44, a spacer layer 45 with partial layers 45a and 45b, a metal layer 46, an adhesive layer 49 and a plurality of surface regions 49a through 49g.

The layers 42, 43, 44, 46 and 49 as well as the diffractive structures 47 are like the corresponding layers 12, 13, 14, 16 and 19 respectively and the diffractive structures 17 as shown in FIG. 1a.

The partial layers 45a and 45b are applied by means of a printing process to the subjacent layers. Thus, firstly the partial layer 45a is applied by printing to the absorption layer 44. In this case, that printing operation is effected only partially. The partial layer 45a is printed on to the absorption layer 44 in the surface regions 49a, 49b and 49g, but not in the surface regions 49c, 49d, 49e and 49f. Such partial printing of the partial layer 45a can be effected here for example by printing it with a printing roller which is of a special design configuration and which applies the partial layer 45a by printing, only in the above-identified surface regions.

It is however also possible for the partial layer 45a to be applied by printing to the absorption layer 44 over the entire surface area thereof and for the partial layer 45a then to be removed partially in region-wise manner by one of the above-described processes (positive etching, negative etching or ablation).

In the next step the partial layer 45b is also applied by means of a printing process to the subjacent layers. As can be seen from FIG. 3, in this case the partial layer 45a is over-printed by the partial layer 45b in the surface region 49b and the partial layer 45b is printed directly on to the absorption layer 44 in the surface regions 49c and 49d. That second printed layer is also either only partially applied by printing or it is removed in region-wise manner again by means of one of the above processes (negative etching, positive etching or ablation). As shown in the surface region 49c, when the partial layer 45b is applied by printing, there is a vertical increase in height in the partial layer 45b in the transitional region between the over-printing of the partial layer 45a and direct printing on to the absorption layer 44; that vertical increase in height, in that region, results in a thickness of the spacer layer 45, which approximately corresponds to the overall layer thickness of the partial layers 45a and 45b.

Accordingly, the person viewing the optically variable element 4, in the surface regions 49a, 49d and 49g, sees first color shift effects which are dependent on the viewing angle and which, in the surface regions 49d and 49g, are superimposed by the optical-diffraction effects of the diffractive structure 47. In the surface regions 49b and 49c there are second color shift effects which are dependent on the viewing angle and which differ markedly from the first viewing angle-dependent color shift effects. In the surface region 49c that second viewing angle-dependent color shift effect is superimposed by the optical-diffraction effects produced by the diffractive structure 47. There is no spacer layer in the surface region 49e and the person viewing the arrangement only sees the optical-diffraction effects produced by the diffractive structure 47. The surface region 49f represents a pure reflecting element, for the person viewing it.

A large number of interesting and attractive effects can be produced by means of the above-described process for applying partial layers of the spacer layer 45 by means of a printing procedure. Thus it is possible for example for one or more of the partial layers of the spacer layer 45 to be applied by printing in region-wise manner, by means of a random procedure. Layers which are to be applied by printing can be applied by printing in register relationship or displaced in random relationship with each other. The use of a multiple roller assembly is also possible, by means of which random patterns can be targetedly and deliberately produced.

Further advantages are afforded by virtue of the fact that partial layers can be in the form of a repetitive pattern. Thus, by means of a printing tool of suitable configuration, it is possible for a repetitive complex pattern to be printed at high working speed on the absorption layer 44 and/or on one or more partial layers of the spacer layer, which have already been applied by printing. In that way, in a fashion which is very interesting from the economic point of view, it is possible to produce optically variable elements which have quite complex patterns formed by two or more color shift effects which are dependent on viewing angle.

A so-called fingerprint can further be produced by applying a random pattern by a printing procedure. Here, the optical layer thickness of the partial layer which is in the form of a random pattern is preferably in the range of between 0.05 and 2 μm.

It will be appreciated that it is also possible to use the process described with reference to FIG. 3 for the production of the spacer layer 45, also to produce thin film layer successions which are made up of a plurality of dielectric layers with different refractive indices. In this case, the procedure adopted is to correspond to that described in the embodiment shown in FIG. 1a.

Figure 4:
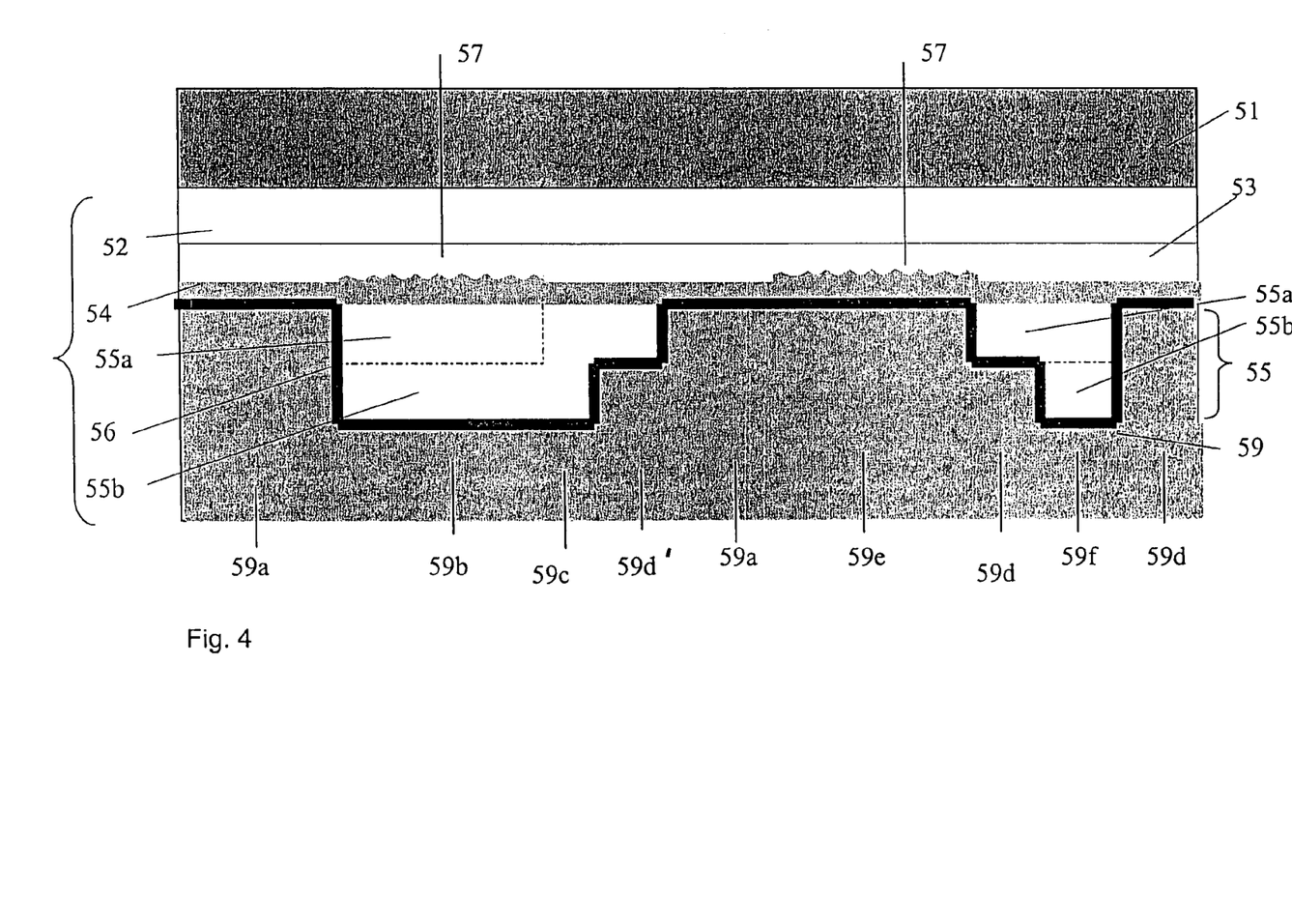
FIG. 4 shows a view in section through an optically variable element according to the invention for a fifth embodiment of the invention.

Reference is now made to FIG. 4 to describe the possible way of constructing a spacer layer of an optically variable element according to the invention from partial layers which on the one hand are applied by vapor deposition and which on the other hand are applied by means of a printing process.

FIG. 4 shows the optically variable element 5 which is applied to a carrier 51. The carrier 51 is like the carrier 11 shown in FIG. 1a.

The optically variable element 5 has a release and protective lacquer layer 52, a replication layer 53, an absorption layer 54, a spacer layer 55 with two partial layers 55a and 55b, a metal layer 56, an adhesive layer 59 and a plurality of surface regions 59a through 59f.

The layers 52, 53, 54, 56 and 59 are like the corresponding layers 12, 13, 14, 16 and 19 respectively shown in FIG. 1a. In addition, embossed in the replication layer 53 are diffractive structures 57 which can be like the diffractive structures 17 of FIG. 1a.

The partial layer 55a is now applied to the absorption layer 54 by means of a vapor deposition process. In that respect it is advantageous for the partial layer 55a to be applied to the absorption layer 54 only in a region-wise manner and in a pattern configuration, as shown in FIG. 4. That can be achieved on the one hand by a procedure whereby the partial layer 55a is applied by vapor deposition only in certain surface regions, by means of the use of vapor deposition masks. In addition, that is possible by a procedure whereby the partial layer 55a is applied by vapor deposition to the absorption layer 54 over the full surface area thereof and is then removed region-wise by means of one of the above-described processes (positive etching, negative etching or ablation).

The partial layer 55b is now applied by printing to the partial layer 55a produced by vapor deposition in that way. In that case, in surface regions, for example in the surface regions 59b and 59c, it is possible to provide for over-printing of the partial layer 55a already applied by vapor deposition. In other surface regions, for example in the surface regions 59c and 59d, the partial layer 55b is applied by printing directly to the absorption layer. As can be seen from FIG. 4, in the surface region 59c, as already described in relation to FIG. 3, there is an increase in the effective layer thickness of the partial layer 55b, by virtue of the over-printing over the region boundary of the partial layer 55a.

The differing choice of the layer thicknesses of the partial layers 55a and 55b means that in that way surface regions involving different spacer layer thicknesses can be produced. In the surface region 59b the spacer layer 55 is of a thickness which corresponds to the overall layer thickness of the partial layers 55a and 55b. In the surface region 59d the spacer layer is of a thickness corresponding to the layer thickness of the partial layer 55b. In the region 59a, mirror layers or colored surfaces are to be produced by a suitable choice of the reflection and absorption materials. Similar surfaces with diffractive effects are also to be produced in the region 59e. Depending on the respective choice of the layer thicknesses of the partial layers 55a and 55b, the spacer layer 55 can thus assume three different layer thicknesses in those different surface regions.

Accordingly, by means of the process described with reference to FIG. 4, it is possible to produce an optically variable element which has surface regions with three different color shift effects which are dependent on viewing angle. By increasing the number of partial layers which are applied by vapor deposition or printing, the number of viewing angle-dependent color shift effects produced in the optically variable element 5 can be correspondingly increased.

Figure 5:
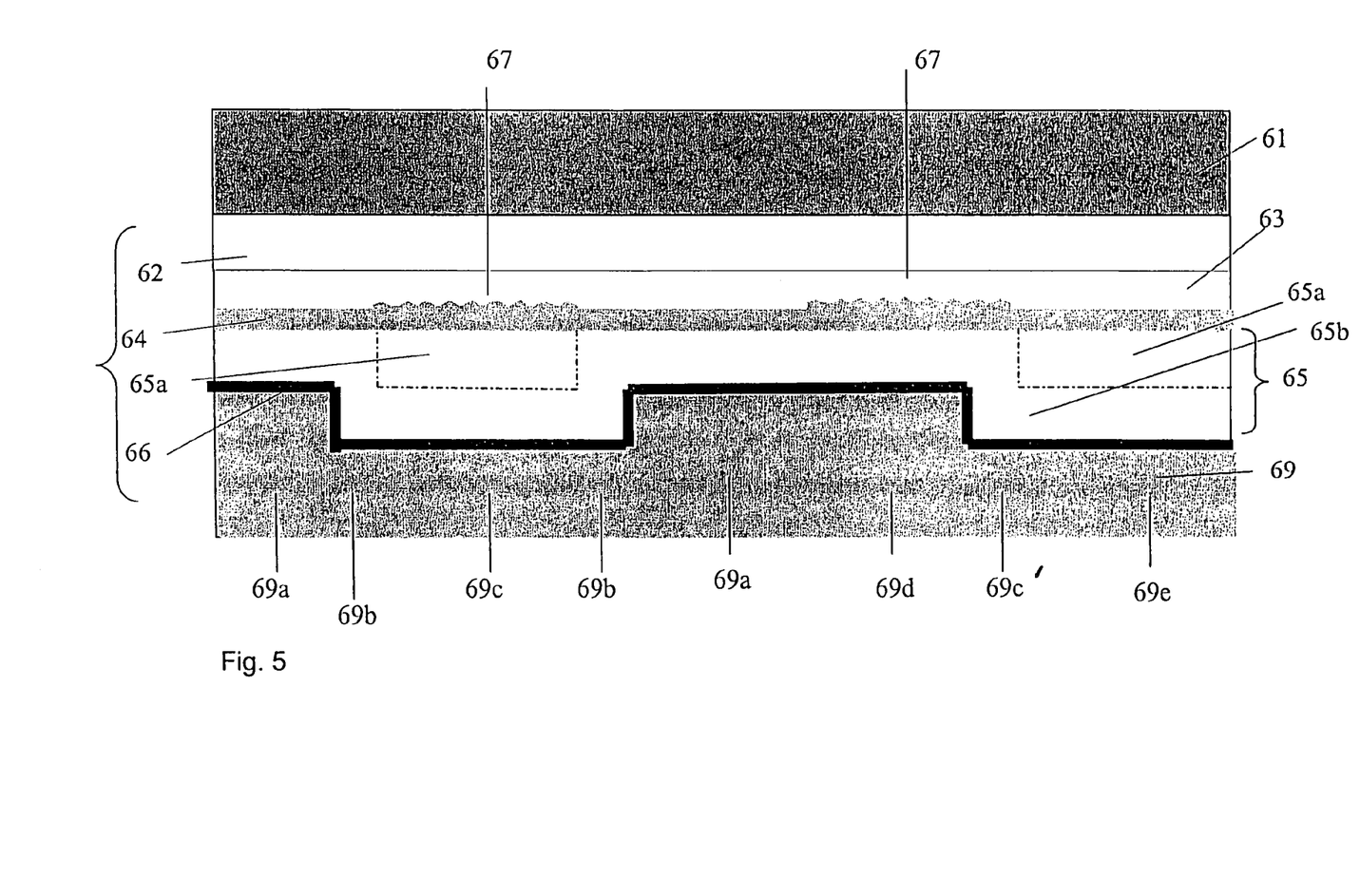
FIG. 5 shows a view in section through an optically variable element according to the invention for a sixth embodiment of the invention.

Reference is now made to FIG. 5 to describe a further possible way of producing a spacer layer for an optically variable element according to the invention, by means of different partial layers.

FIG. 5 shows an optically variable element 6 which is applied to a carrier 61. The carrier 61 is like the carrier 11 of FIG. 1a.

The optically variable element 6 has a release and protective lacquer layer 62, a replication layer 63, an absorption layer 64, a spacer layer 65 with two partial layers 65a and 65b, a metal layer 66 and an adhesive layer 69. FIG. 5 further shows a plurality of surface regions 69a through 69e.

The layers 62, 63, 64, 66 and 69 are like the corresponding layers 12, 13, 14, 16 and 19 respectively shown in FIG. 1a. Embossed in the replication layer 63 is a diffractive structure 67 which can be like the diffractive structure 17 shown in FIG. 1a.

The partial layer 65a is now applied to the absorption layer 64 by means of a printing process. In that respect, it is advantageous if the partial layer 65a is applied by printing only in a region-wise manner.

As shown in FIG. 5 the partial layer 65a is applied by printing to the absorption layer 64, only in the surface regions 69c and 69e. That partial printing of the partial layer 65a can be effected by means of printing rollers of a suitable design configuration. It is however also possible for the partial layer 65a to be applied to the absorption layer 64 by printing over the entire surface area thereof and then removed again region-wise by means of one of the above-described processes (positive etching, negative etching or ablation).

The partial layer 65b is now applied by vapor deposition to the present layer sequence, over the full surface area thereof. In that way in the surface regions 69c and 69e, the subjacent printed partial layer 65a is over-laid by the partial layer 65b by vapor deposition, while in the surface regions 69a, 69b, 69d and 69c, the partial layer 65b is applied to the absorption layer 64 by vapor deposition. In the surface region 69b, there is the increase, which has already been described hereinbefore, in the effective layer thickness of the partial layer 65b.

The embodiment shown in FIG. 5 represents an embodiment which is particularly attractive from economic points of view. Thus, by means of a printing tool of a suitable design configuration, it is possible for the partial layer 65a to be applied to the spacer layer 64 in pattern form quickly and inexpensively, in a simple printing procedure. In addition, vapor deposition of the partial layer 65b, over the full surface area, represents a standard procedure which can also be quickly and inexpensively carried into effect. Thus, the solution shown in FIG. 5 represents a particularly inexpensive implementation of an optically variable element according to the invention, by means of which it is possible to produce two different viewing angle-dependent color shift effects on an optically variable element.

Figure 6:
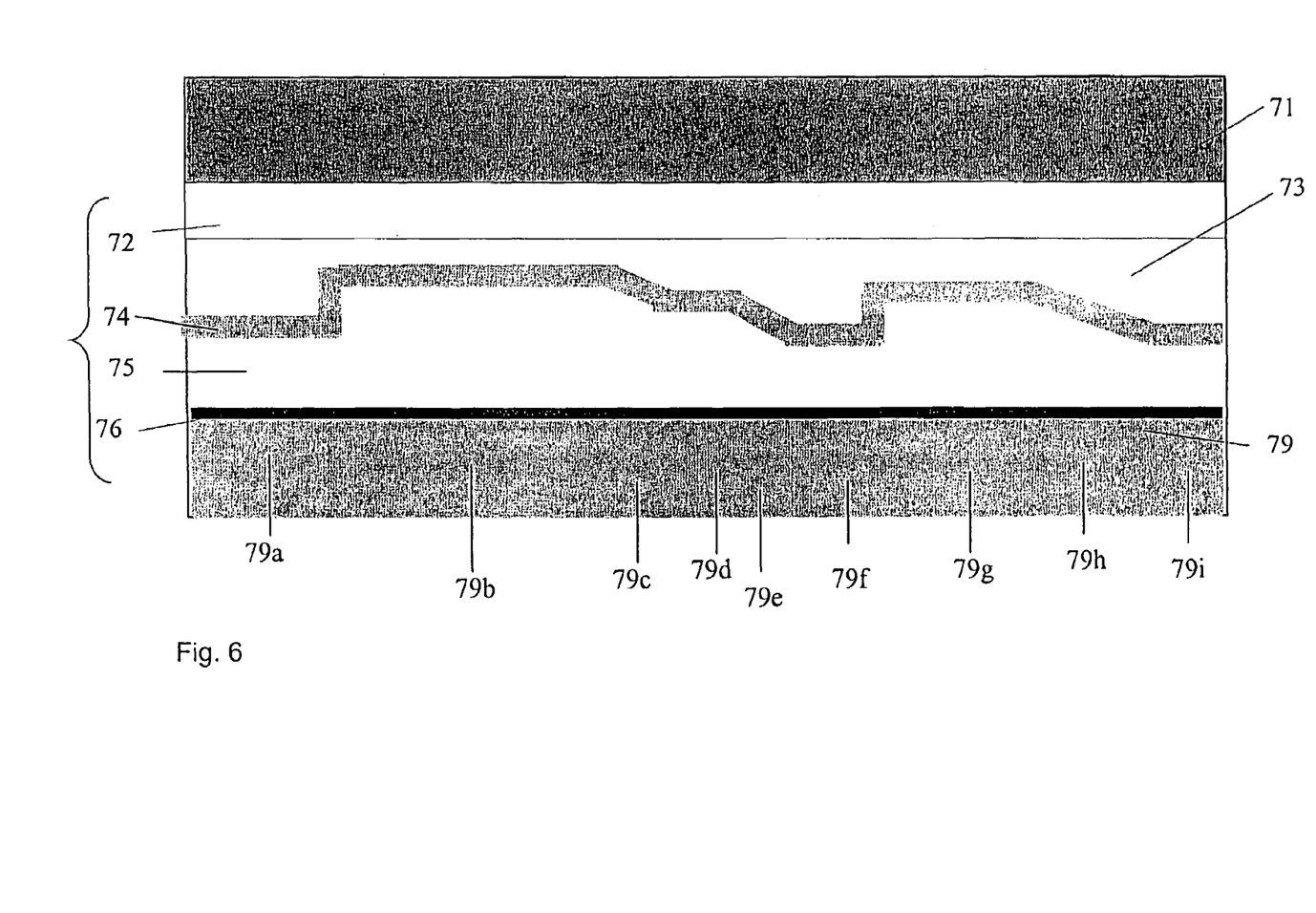
FIG. 6 shows a view in section through an optically variable element according to the invention for a seventh embodiment of the invention.

Reference will now be made to FIG. 6 to discuss a possible way of producing an optically variable element according to the invention with a varying spacer layer thickness, without constructing the spacer layer from two or more partial layers.

FIG. 6 shows an optically variable element 7 which is applied to a carrier 71. The carrier 71 is like the carrier 11 shown in FIG. 1a.

The optically variable element 7 has a release and/or protective lacquer layer 72, a replication layer 73, an absorption layer 74, a spacer layer 75, a metal layer 76 and a plurality of surface regions 79a through 79i.

The layers 72, 74, 76 and 79 are like the corresponding layers 11, 12, 14, 16 and 19 respectively shown in FIG. 1a.

The replication layer 73 comprises a thermoplastic material. A macrostructure which is of the configuration as shown in FIG. 6 is produced in that thermoplastic material by means of an embossing tool or by means of ablation. The absorption layer 74 is then applied to the replication layer 73 by vapor deposition. The spacer layer 75 is now applied to the absorption layer 74. In this respect, the materials referred to in the embodiment of FIG. 1a for the spacer layer 15 can be used for the spacer layer 75.

In this case the spacer layer 75 can be applied either by vapor deposition or by printing. In addition, it is possible to apply a lacquer to the absorption layer, the lacquer having the optical properties of the spacer layer 15, which were described in the embodiment shown in FIG. 1a.

The spacer layer 75 is now processed in such a way that its surface which is in opposite relationship to the absorption layer 74 is substantially planar. That can be effected on the one hand if the spacer layer 75 is put into the appropriate form by means of a printing tool, while in a condition of not yet being entirely hardened. It is further possible for the spacer layer 75 to acquire that corresponding form, by a material-removal operation.

It is also possible for a UV-hardenable lacquer to be applied as the spacer layer 75. When applying the lacquer, the lacquer is still fluid, whereby a substantially planar surface is produced on the surface which is in opposite relationship to the absorption layer 74. The lacquer is then hardened by means of UV-radiation. A lacquer which hardens in air can also be used. In that respect, it is to be noted that the final volume of the applied lacquer, after hardening, is larger than the structural volume of the macrostructure.

The metal layer 75 is then applied as the next step. In regard to the metal layer 76 it is also possible to implement the alternatives described in the embodiment shown in FIG. 1a (partial metal layer, highly reflective layer, optical separation layer).

The adhesive layer 79 is then applied.

As can be seen from FIG. 6, respectively different color shift effects which are dependent on viewing angle are thus produced in different surface regions of the optically variable element 7:

The layer thickness of the spacer layer is respectively different in the surface regions 79a, 79b, 79d, 79f, 79g and 79i. Accordingly those surface regions respectively involve different color shift effects which are dependent on viewing angle. In each of the surface regions 79c, 79e and 79h the layer thickness of the spacer layer 75 changes continuously. Accordingly, in those regions, the person viewing the optically variable element 7 sees a steady, continuous transition in respect of the color shift effects which are dependent on viewing angle.

It is also possible for the configuration of the layer thickness of the spacer layer 75, which is shown in FIG. 6, to be achieved in a different manner: thus it is possible to achieve a similar configuration for the layer thickness, as is shown in FIG. 6, by printing a spacer layer on a planar absorption layer, by virtue of the choice of suitable printing rollers. In that case however the surface of the spacer layer, which adjoins the absorption layer, is planar, and the surface of the spacer layer, which adjoins the metal layer, is of a structured configuration, as shown in FIG. 6. That spacer layer which is applied in structured fashion by the printing process is then covered by a vapor-deposited metal layer and provided with an adhesive layer, which compensate for the spacer differences which also occur in respect of the metal layer.

This process can also be used in relation to a thin film layer succession in which the thin film layer succession is made up of a plurality of dielectric layers with different refractive indices.

What is claimed is:

1. An optically variable element, wherein the optically variable element has a thin film layer succession with at least one spacer layer for producing color shifts by means of interference, wherein in a first region of the thin film layer succession the spacer layer is of a different layer thickness from in a second region of the thin film layer succession, wherein the layer thicknesses of the spacer layer in the first and second regions are so selected that in the first region of the thin film layer succession a first color shift is produced by means of interference and in the second region of the thin film layer succession a second color shift which is different from the first color shift is produced,
wherein the optically variable element has a diffractive structure for producing diffraction effects, wherein the diffractive structure covers the first and/or the second regions of the thin film layer succession.

2. An optically variable element as set forth in claim 1, wherein the spacer layer in the second region comprises two or more mutually superposed partial layers which jointly form the spacer layer in that region and that the spacer layer in the first region of the thin film layer succession has only one of the two or more partial layers, which forms the spacer layer in that region of the thin film layer succession.

3. An optically variable element as set forth in claim 2, wherein the two or more mutually superposed partial layers are formed as different patterns.

4. An optically variable element as set forth in claim 2, wherein at least one of the partial layers is in the form of a random pattern.

5. An optically variable element as set forth in claim 2, wherein the two or more mutually superposed partial layers are applied one over the other by means of masks of different shapes.

6. An optically variable element as set forth in claim 2, wherein the two or more mutually superposed partial layers are applied by means of a printing process, wherein a partial layer applied in a first printing process is over-printed in a second printing process.

7. An optically variable element as set forth in claim 1, wherein the layer thickness of the spacer layer changes continuously and/or non-continuously between the first and second regions of the thin film layer succession so that in said region of the thin film layer succession the color shift produced by the thin film layer succession changes continuously or non-continuously respectively.

8. An optically variable element as set forth in claim 1, wherein the spacer layer is delimited on the one hand by an absorption layer applied to a macro-structured replication layer and on the other hand by a substantially planar layer so that the layer thickness of the spacer layer is determined by the macro-structured replication layer.

9. An optically variable element as set forth in claim 1, wherein the spacer layer is macro-structured and is delimited on the one hand by an applied absorption layer and on the other hand by a reflection layer.

10. An optically variable element as set forth in claim 9, wherein the macro-structured spacer layer is produced by means of a surface-structured printing roller.

11. An optically variable element as set forth in claim 1, wherein the spacer layer is colored.

12. An optically variable element as set forth in claim 1, wherein the thin film layer succession has an absorption layer.

13. An optically variable element as set forth in claim 1, wherein the thin film layer succession has an absorption layer which acts as an absorption layer and as a replication layer.

14. An optically variable element as set forth in claim 1, wherein the thin film layer succession has an absorption layer and a replication layer, the absorption layer and the replication layer being formed from the same material.

15. An optically variable element as set forth in claim 1, wherein the thin film layer succession has a plurality of layers of differing refraction.

16. An optically variable element as set forth in claim 1, wherein the layer thickness of the spacer layer in the second region is so selected that the coherence condition is not fulfilled in the second region.

17. An optically variable element as set forth in claim 1, wherein the thin film layer succession has a reflecting layer.

18. An optically variable element as set forth in claim 1, wherein the reflecting layer only partially covers the surface region of the thin film layer.

19. An optically variable element as set forth in claim 1, wherein the optically variable element has a continuous transparent layer.

20. A security product having an optically variable element as set forth in claim 1.

21. A foil having an optically variable element as set forth in claim 1.

22. A process for producing an optically variable element, wherein applied to a substrate is a thin film layer succession with at least one spacer layer for producing color shifts by means of interference, wherein in a first region of the thin film layer succession the spacer layer is shaped in a different layer thickness from in a second region, of the thin film layer succession, wherein the layer thicknesses of the spacer layer in the first and second regions are so selected that in the first region of the thin film layer succession a first color shift is produced by means of interference and in the second region of the thin film layer succession a second color shift which is different from the first color shift is produced, wherein the optically variable element is provided with a diffractive structure for producing diffraction effects, wherein the diffractive structure is arranged in such a way that it covers the first and/or the second region of the thin film layer succession.

23. A process as set forth in claim 22, wherein two or more partial layers are applied in mutually superposed relationship to produce the spacer layer, wherein in the second region of the thin film layer succession the spacer layer is formed by two or more of the partial layers and thus the layer thicknesses of the partial layers are added and in the first region of the thin film layer succession the spacer layer is formed by only one of the partial layers.

24. A process as set forth in claim 22, wherein one or more of the partial layers is applied by vapor deposition.

25. A process as set forth in claim 22, wherein two or more of the partial layers are applied by vapor deposition using vapor deposition masks of differing forms.

26. A process as set forth in claim 22, wherein one or more of the partial layers is applied by a printing process.

27. A process as set forth in claim 22, wherein a spacer layer is printed on the substrate by means of a multiple roller assembly, the thickness of the spacer layer changing randomly.

28. A process as set forth in claim 22, wherein different patterns are printed on to the substrate in register relationship with differing layer thicknesses.

* * * * *